United States Patent
Izumo et al.

(10) Patent No.: US 6,192,932 B1
(45) Date of Patent: *Feb. 27, 2001

(54) MANIFOLD VALVE

(75) Inventors: Shuji Izumo; Hironori Matsuzawa, both of Aichi (JP)

(73) Assignee: Advance Denki Kogyo Kabushiki Kaisha, Aichi-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,603

(22) Filed: Apr. 8, 1998

(30) Foreign Application Priority Data

Apr. 16, 1997 (JP) .................................................. 9-115255

(51) Int. Cl.[7] .................................................. F16K 11/20
(52) U.S. Cl. .................................................. 137/606; 251/63.5
(58) Field of Search .................................. 137/606, 607; 251/63.5

(56) References Cited

U.S. PATENT DOCUMENTS

| | | | | |
|---|---|---|---|---|
| 3,572,366 | * | 3/1971 | Wiggins | 137/606 |
| 3,797,524 | * | 3/1974 | Sanelli | 137/606 |
| 3,811,279 | * | 5/1974 | Vogeli | 251/63.5 X |
| 3,838,707 | * | 10/1974 | Wachowitz | 251/63.5 X |
| 4,290,442 | * | 9/1981 | Shaffer | 137/607 X |
| 4,306,587 | * | 12/1981 | Tchebinyayeff | 137/606 |
| 4,335,744 | * | 6/1982 | Bey | 251/63.5 X |
| 4,819,691 | * | 4/1989 | Lofgren et al. | 251/63.5 X |
| 5,035,262 | * | 7/1991 | Schweikert | 137/607 |

* cited by examiner

Primary Examiner—Stephen M. Hepperle
(74) Attorney, Agent, or Firm—Arent Fox Kintner Plotkin & Kahn, PLLC

(57) ABSTRACT

A manifold valve has an intake for receiving a secondary fluid, a passage upwardly extending from the intake, a valve unit for opening and closing a top end of the passage, and a main channel having an opening on a bottom wall thereof, the opening facing the top end of the passage. The secondary fluid is upwardly supplied into the main channel through the intake, passage, and opening when the valve unit opens the top end of the passage and is stopped when the valve unit closes the top end of the passage.

2 Claims, 3 Drawing Sheets

MANIFOLD VALVE

BACKGROUND OF THE INVENTION

1. Field of the Invention

The present invention relates to a manifold valve for properly supplying secondary fluids into a primary fluid.

2. Description of the Related Art

In some factories, a primary fluid such as pure water is supplied to a work site, and depending on the work or products at the work site, secondary fluids, in prescribed quantities, are selected and added to the primary fluid. FIG. 4 shows a manifold valve 30 used for this purpose and arranged in the middle of piping for supplying the primary fluid to the work site. FIG. 5 is a sectional view taken along a line 5—5 of FIG. 4. For the sake of clear understanding, the sectional view of FIG. 5 cuts across air ports 43 and 44 for vertically driving a valve element 41 of a valve unit 40, and therefore, does not correctly follow the line 5—5 of FIG. 4.

The manifold valve 30 consists of a base block 31 of a rectangular parallelepiped shape and sub-blocks 36 each having the valve unit 40.

The base block 31 has passages 32 formed at given intervals along the length of the base block 31. Each of the passages 32 extends from the top of the base block 31 toward the bottom thereof. A horizontal main channel 33 is formed along the length of the base block 31 under bottom ends of the passages 32. The passages 32 communicate with the main channel 33 through openings 34 formed on the top wall of the main channel 33. Each end of the main channel 33 has a connection port 35.

The sub-blocks 36 are arranged on the base block 31. A lower part of each sub-block 36 has a vertical passage 37 connected to the top of the passage 32 of the base block 31. A side face of the sub-block 36 has a horizontal intake 38 for receiving a secondary fluid. The intake 38 communicates with the passage 37 through a lower part of the valve unit 40. The valve unit 40 is a known one having the valve element 41 that is moved upward by air and downward by a spring 45. The valve element 41 opens and closes the top of the passage 37. The valve unit 40 has a diaphragm 42. In FIG. 4, the base block 31 has five sub-blocks 36.

The manifold valve 30 is inserted into piping for passing a primary fluid, by connecting the opposite ends of the main channel 33 to the piping. Each of the intakes 38 is connected to a unit for supplying a secondary fluid of chemicals. In the left sub-block 36 of FIG. 6, the valve unit 40 is operated to open the top 37a of the passage 37 so that a secondary fluid containing chemicals of a given quantity is supplied down into the main channel 33 through the passages 37 and 32. Secondary fluids containing chemicals of the sub-blocks 36 may be switched from one to another and be supplied into the primary fluid by selectively opening the tops of the passages 37 with the valve units 40.

In FIG. 6, the length of the base block 31 is cut to have only three sub-blocks 36 so that it corresponds to a manifold valve 10 of FIG. 1 to be explained later. The valve units 40 of FIG. 6 are in different states of supplying secondary fluids. In practice, the valve units 40 operate independently of one another, and therefore, may sometimes operate simultaneously and differently depending on the quantities and supplying timing of secondary fluids.

After supplying the secondary fluid into the main channel 33, the valve unit 40 closes the top 37a of the passage 37 to stop the secondary fluid as in the center sub-block 36 of FIG. 6. In this case, a recess 39 is formed to hold the secondary fluid between the top 37a of the passage 37 and the opening 34. Since the top 37a is closed with the valve element 41, the secondary fluid in the recess 39 stays there due to surface tension and gradually drops into the primary fluid in the main channel 33. As a result, the main channel 33 will provide a fluid with unwanted components for a certain time, even though the user wants the primary fluid pure or having specified composition. In this way, the recess 39 deteriorates the efficacy of supply of a required fluid.

When changing a given primary fluid to another, the latter must be supplied to the main channel 33 for a proper time to wash the inside of the valve units 40. Any fluid in the recesses 39 is hardly removed therefrom because the recesses 39 are deeper than the inner surface of the main channel 33. It takes much time, labor, and fluid to completely wash the remaining fluid out of the recesses 39. This is not economical. In addition, chemicals in the recesses 39 may react and solidify to cause trouble.

SUMMARY OF THE INVENTION

An object of the present invention is to provide a manifold valve capable of efficiently preventing a secondary fluid from mixing with a primary fluid as soon as the supply of the secondary fluid to the primary fluid is stopped, to thereby correctly maintain the composition and concentration of the primary fluid, and capable of being easily washed when the primary fluid is changed to another.

In order to accomplish the object, the present invention provides a manifold valve having an intake for receiving a secondary fluid, a passage upwardly extending from the intake, a valve unit for opening and closing a top end of the passage, and a main channel having an opening on a bottom wall thereof, the opening facing the top end of the passage. The secondary fluid is upwardly supplied into the main channel through the intake, passage, and opening when the valve unit opens the top end of the passage and is stopped when the valve unit closes the same.

BRIEF DESCRIPTION OF THE DRAWINGS

Other objects and features of the present invention will be described in detail with reference to the accompanying drawings, in which.

DESCRIPTION OF THE PREFERRED EMBODIMENTS

The present invention will be explained in detail with reference to the drawings.

Figure 1:
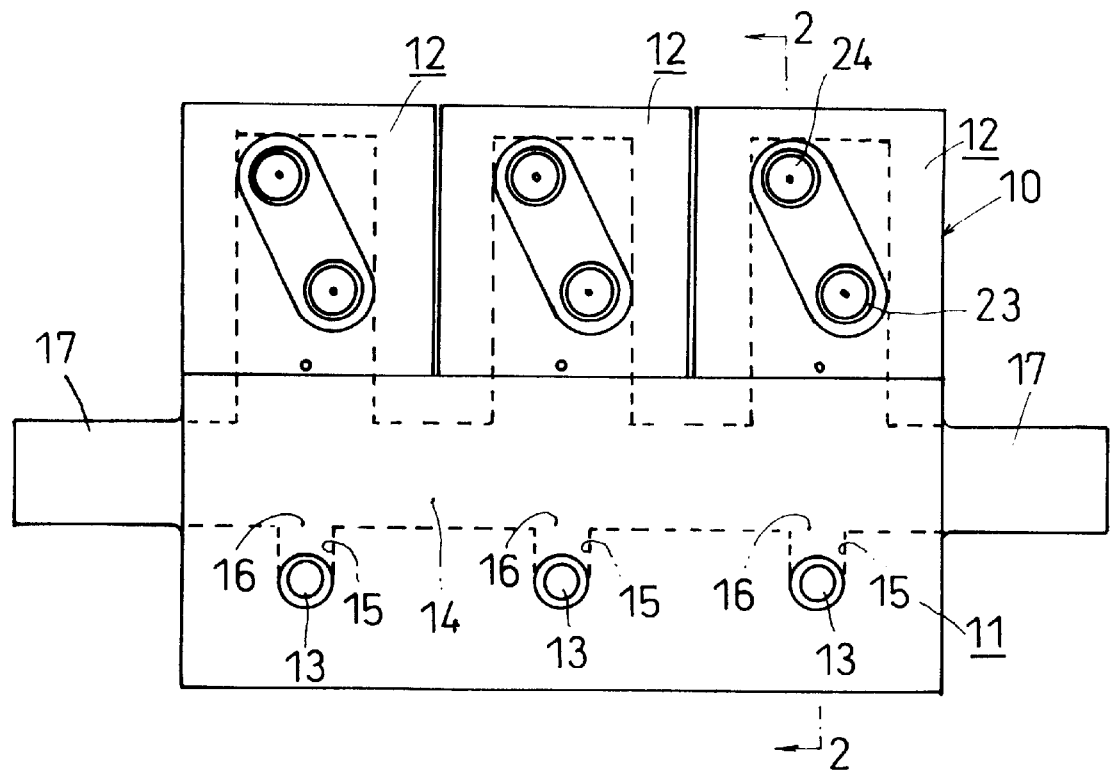
FIG. 1 is a front view showing a manifold valve according to an embodiment of the present invention.
Figure 2:
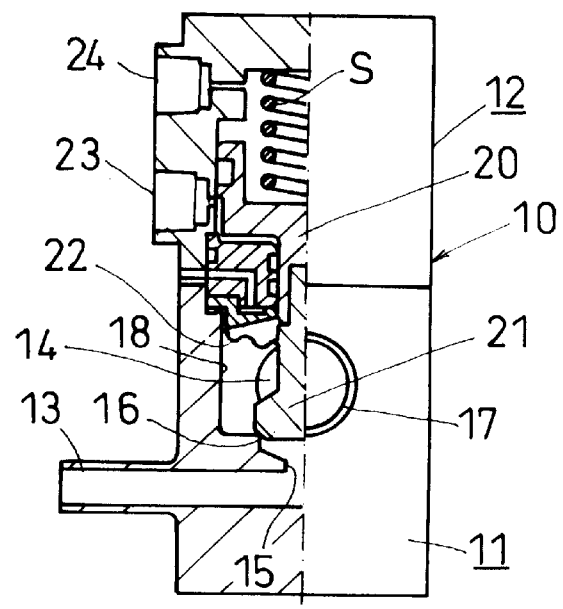
FIG. 2 is a partial sectional view taken along a line 2—2 of FIG. 1.
Figure 3:
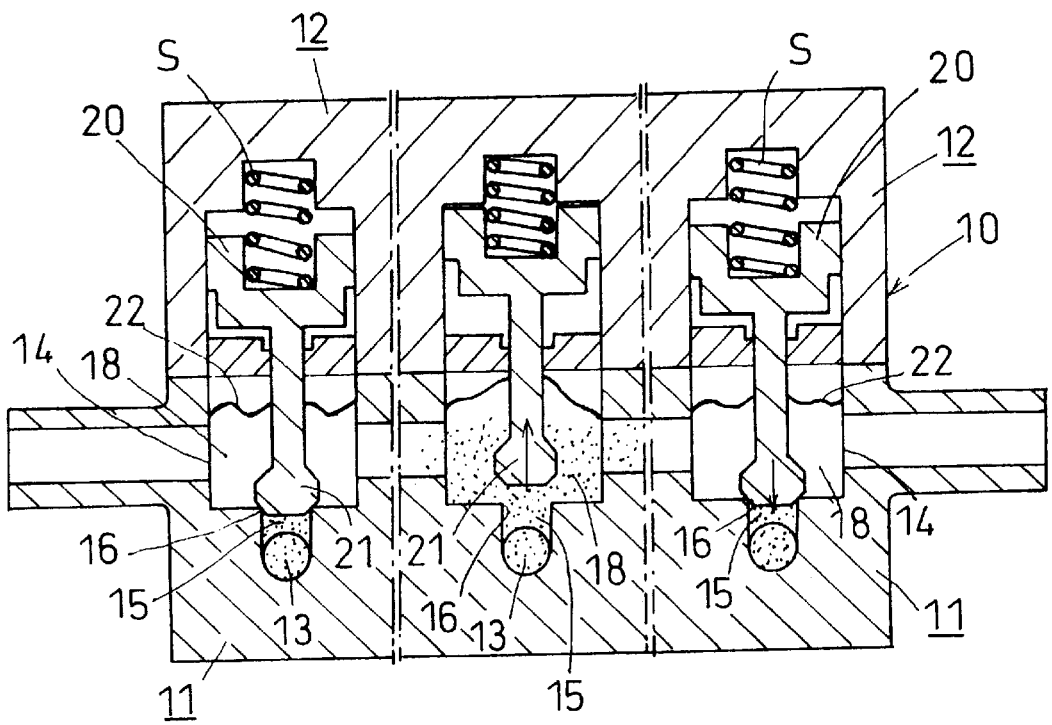
FIG. 3 is a sectional view showing the operation of the embodiment.

FIG. 1 is a front view showing a manifold valve according to an embodiment of the present invention, FIG. 2 is a partial sectional view taken along a line 2—2 of FIG. 1, and FIG. 3 is a sectional view showing the operation of the embodiment.

The manifold valve 10 has intakes 13 for receiving secondary fluids, which are supplied into a main channel 14 through passages 15 and openings 16 formed at top ends of the passages 15. The manifold valve 10 consists of a base block 11 through which the main channel 14 is formed, and sub-blocks 12 having valve units 20 for supplying and stopping the secondary fluids to the main channel 14. The sectional view of FIG. 2 does not correctly follow the line 2—2 of FIG. 1 because it cuts air ports 23 and 24 of the valve unit 20 for the sake of clear understanding.

The base block 11 has a rectangular parallelepiped shape. The main channel 14 horizontally runs along the length of the base block 11. The passages 15 vertically downwardly extend from the ma in channel 14 to the intakes 13.

The intakes 13 are present below and orthogonal to the main channel 14. An end of each intake 13 is open outside the manifold valve 10 and is connected to an apparatus (not shown) for supplying a secondary fluid, so that the secondary fluid is supplied upwardly into the main channel 14 through the passage 15.

The top end of each passage 15 corresponds to the opening 16 that is formed on the bottom wall of the main channel 14. The valve unit 20 in each sub-block 12 opens and closes the opening 16. When the valve unit 20 opens the opening 16, the secondary fluid is upwardly supplied into the main channel 14. Each end of the main channel 14 has a connection port 17 that is open to the outside of the manifold valve 10.

Each sub-block 12 is installed on the base block 11 so that the valve unit 20 covers the upper part of the main channel 14 and so that a valve chest 18, formed at a lower part of the valve unit 20, protrudes into the main channel 14. Namely, the main channel 14 runs through the valve chest or chamber 18. The valve units 20 correspond to the openings 16, respectively. The valve units 20 may be known ones with a valve element 21 in the valve chamber 18 being raised by air and lowered by a spring S that is above the valve chest 18. The valve unit 20 has a diaphragm 22 and the air ports 23 an d 24 for vertically moving the valve element 21. The valve units 20 are connected to a controller (not shown) to vertically drive the valve elements 21 across the main channel 14, to thereby open and close the openings 16 from the inside of the main channel 14 and supply and stop secondary fluids in required quantities from the intakes 13 into the main channel 14.

It is preferable to provide the ba se block 11 with a plurality of sub-blocks 12 each having the valve unit 20, so that a plurality of secondary fluids may be supplied to the main channel 14. The valve units 20 may be operated independently of one another so that the secondary fluids may be switched from one to another and so that the supply quantities thereof may be adjustable. The operations of the valve units 20 may be related to one another so that the secondary fluids may simultaneously or alternately be supplied. These operations are realized by employing a computer (not shown) to control the air supply apparatus connected to the air ports 23.

Parts of the base block 11, sub-blocks 12, valve elements 21, diaphragms 22, etc., that touch fluids are made from materials selected according to the characteristics of the primary and secondary fluids. The materials include, for example, PTFE (polytetrafluoroethylene) that is resists acids and alkalis.

The operation of the manifold valve 10 will be explained with reference to FIG. 3. The valve units 20 of FIG. 3 are positioned to simultaneously illustrate the different supplying operations of secondary fluids. In practice, the valve units 20 operate independently of one another.

In the left sub-block 12 of FIG. 3, the intake 13 receives a secondary fluid, which fills the passage 15. In the center sub-block 12, the valve element 21 is lifted to open the opening 16 and upwardly supply a given quantity of the secondary fluid from the passage 15 into the main channel 14.

In the right sub-block 12 of FIG. 3, air to the valve unit 20 is switched to lower the valve element 21 due to the resiliency of the spring S. The valve element 21 closes the opening 16 from the inside of the main channel 14, to stop the supply of the secondary fluid into the main channel 14. As a result, only a primary fluid flows through the main channel 14. Since the opening 16 on the bottom of the main channel 14 is closed by the valve element 21 from the inside of the main channel 14, and since the opening 16 is at the top of the passage 15, no recess to hold the secondary fluid is formed between the main channel 14 and the passage 15. Accordingly, the supply of the secondary fluid into the primary fluid is surely stopped or started. When the supply of the secondary fluid is stopped, there is no secondary fluid to be mixed with the primary fluid in the main channel 14. Since the main channel 14 passes through the valve chambers 18 and since the valve elements 21 in the valve chests 18 cross the main channel 14, secondary fluids supplied to the main channel 14 are efficiently mixed with a primary fluid, and therefore, the concentration and chemical composition of a resultant fluid are correctly maintained.

Figure 6:
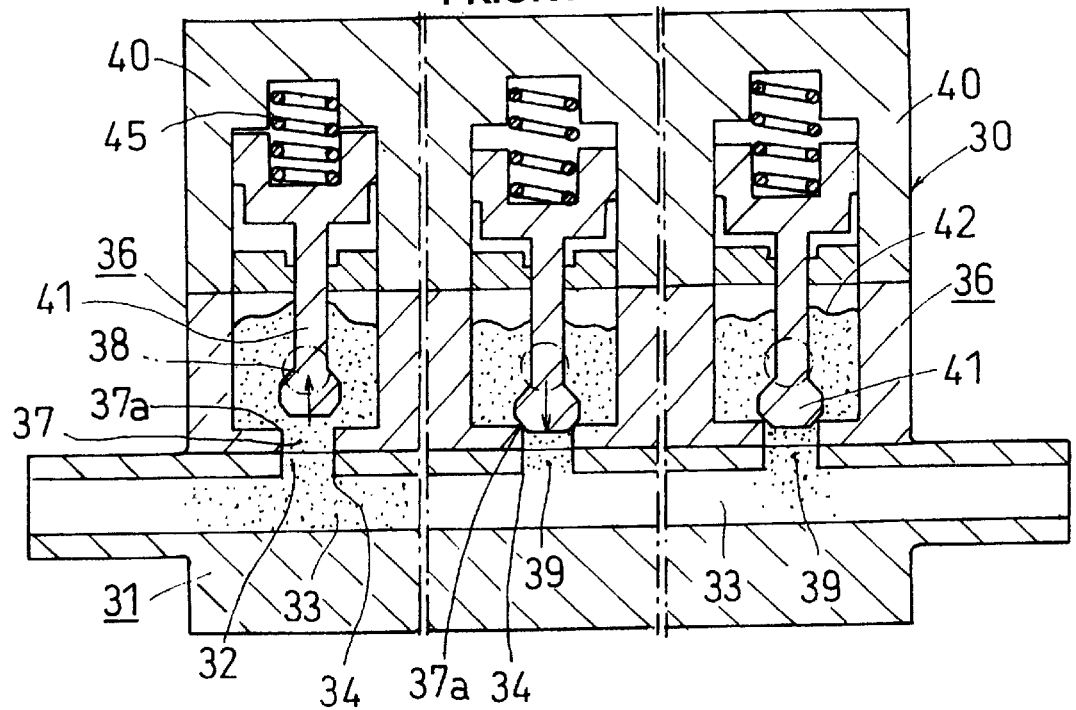
FIG. 6 is a sectional view showing the operation of the prior art.
Figure 4:
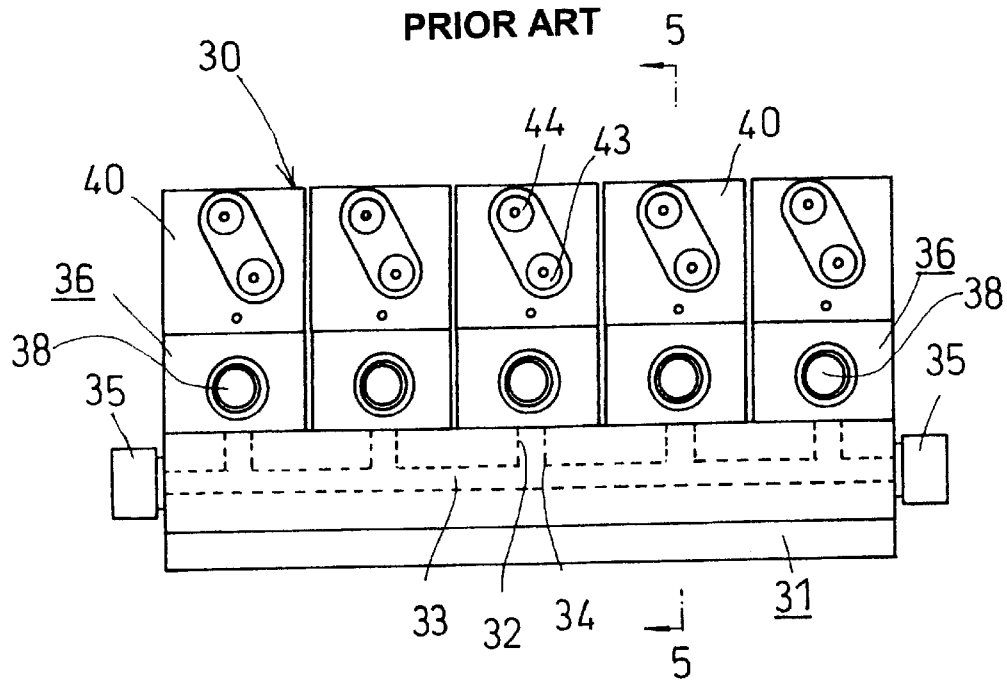
FIG. 4 is a front view showing a manifold valve according to a prior art.
Figure 5:
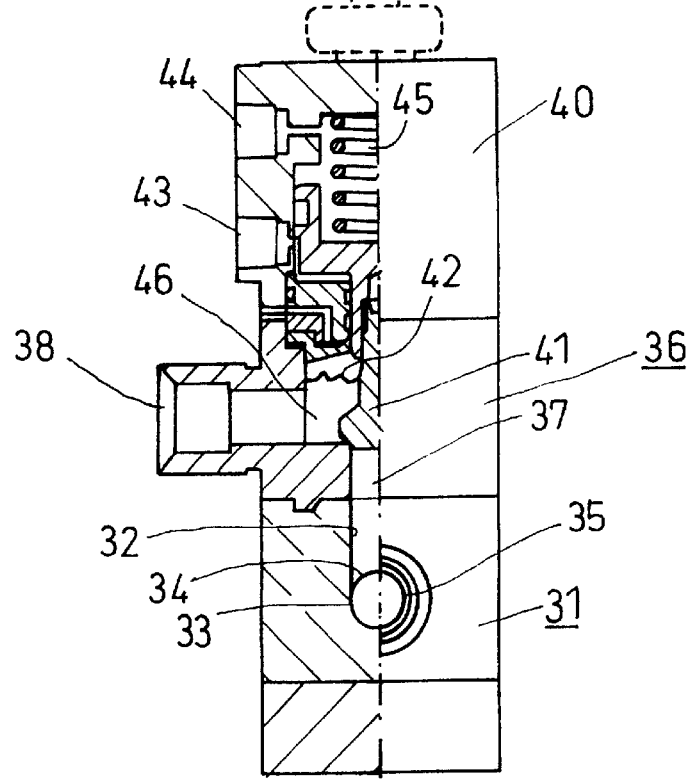
FIG. 5 is a partial sectional view taken along a line 5—5 of FIG. 4.

When the supply of secondary fluids is stopped by closing the openings 16 on the bottom wall of the main channel 14, there are no recesses such as the recesses 39 of the prior art of FIG. 6 on the wall of the main channel 14. Accordingly, the main channel 14 is washed easily, efficiently, and economically when changing the present primary fluid to another. Since the valve chests 18 are linearly arranged along the main channel 14, they are easily and efficiently washed when the main channel 14 is washed.

To change a secondary fluid of a given intake 13 to another, washing only the intake 13 and passage 15 in question is sufficient. It is not necessary to wash the corresponding valve unit 20, and therefore, the secondary fluid changing work is simple. Since each passage 15 upwardly extends from the intake 13, a secondary fluid in the passage 15 smoothly returns toward the intake 13 by its own weight when the supply of the secondary fluid into a primary fluid is stopped. The intake 13 and passage 15, therefore, are easy to wash when changing the secondary fluid to another.

As explained above, the manifold valve of the present invention forms no recesses to hold fluids on the wall of the main channel when the openings on the wall are closed with the valve units. Namely, once the valve units close the openings on the wall of the main channel, there will be no secondary fluids remaining in the main channel to be mixed with a primary fluid, and therefore, only the primary fluid will flow through the main channel. In this way, the manifold valve of the present invention is capable of correctly maintaining the concentration and composition of a primary fluid. The shape of the main channel with the valve units closing the openings on the wall of the main channel is simple, and therefore, it is easy to surely wash the inside of the manifold valve and efficiently and economically change the present primary fluid to another. No previous fluids remain in the main channel, and therefore, no trouble, causing a chemical reaction, occurs there.

What is claimed is:

1. The manifold valve comprising:

a main body;

first and second co-axial connection ports formed on opposite sides of the main body;

an intake formed in said main body and for receiving a secondary fluid;

a passage formed in the main body and upwardly extending from the intake;

a valve unit opening and closing a top end of the passage; and a main channel extending between said first and second connection ports, said main channel having an opening on a bottom wall thereof, the opening defining the top end of the passage, the secondary fluid being upwardly supplied into the main channel through the intake, passage, and opening when the valve unit opens the top end of the passage and the secondary fluid being stopped when the valve unit closes the top end of the passage, the valve unit having a valve chamber formed at lower part of the valve unit and a valve element vertically movable in the valve chamber, wherein the main channel extends through the valve chamber, and a bottom end of the valve chamber corresponds to the bottom wall of the main channel.

2. The manifold valve of claim 1, wherein the main channel is provided with a plurality of openings each of which is provided with the passage, valve unit, and intake.

* * * * *